United States Patent [19]

Miyahara

[11] Patent Number: 4,565,272
[45] Date of Patent: Jan. 21, 1986

[54] SELF-ALIGNING TYPE CLUTCH RELEASE APPARATUS

[75] Inventor: Takashi Miyahara, Yokohama, Japan

[73] Assignee: Nippon Seiko Kabushiki Kaisha, Tokyo, Japan

[21] Appl. No.: 576,403

[22] Filed: Feb. 2, 1984

[30] Foreign Application Priority Data

Feb. 12, 1983 [JP] Japan .................................. 58-21843

[51] Int. Cl.⁴ ............................................. F16D 23/14
[52] U.S. Cl. .................................. 192/98; 192/110 B
[58] Field of Search .............. 192/98, 110 B; 384/495, 384/517, 558, 612

[56] References Cited

U.S. PATENT DOCUMENTS

| 1,431,551 | 10/1922 | White | 192/110 B |
| 2,397,164 | 3/1946 | Shafer | 384/495 |
| 4,305,492 | 12/1981 | Tonoki | 192/110 B |

FOREIGN PATENT DOCUMENTS

| 56-13432 | 10/1981 | Japan | 192/110 B |
| 474112 | 10/1937 | United Kingdom | 192/110 B |
| 2045382 | 10/1980 | United Kingdom . | |

Primary Examiner—Ronald H. Lazarus
Attorney, Agent, or Firm—Shapiro and Shapiro

[57] ABSTRACT

A self-aligning type clutch release apparatus includes a clutch release bearing, bearing holding means for holding and guiding the clutch release bearing and a self-aligning coupling intermediate the bearing and bearing holding means. The coupling includes an aligning auxiliary member interposed between the clutch release bearing and the bearing holding means, first means for rendering the aligning auxiliary member rockable in all directions about a first point relative to the bearing holding means, second means for rendering the clutch release bearing rockable in all directions about a different point relative to the aligning auxiliary member, and third means for damping the rocking movement of the aligning auxiliary member relative to the bearing holding means and the rocking movement of the clutch release bearing relative to the aligning auxiliary member. Following alignment of the apparatus, the auxiliary member and the clutch release bearing are maintained in dynamically stable positions.

9 Claims, 7 Drawing Figures

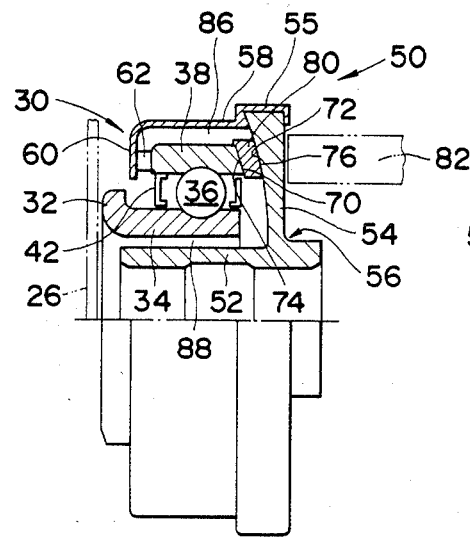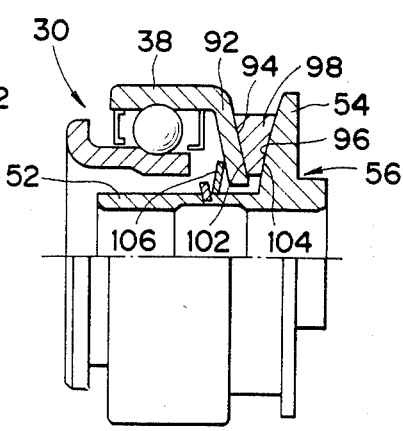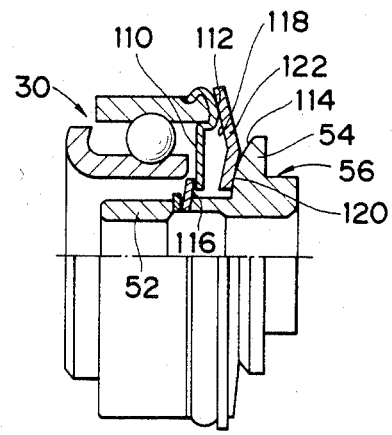

SELF-ALIGNING TYPE CLUTCH RELEASE APPARATUS

BACKGROUND OF THE INVENTION

1. Field of the Invention

This invention relates to improvements in a clutch release apparatus having a self-aligning mechanism.

2. Description of the Prior Art

The clutch release apparatus is interposed between a diaphragm spring and a fork member in the clutch mechanism of a vehicle, and comprises a clutch release bearing having a portion brought into contact with the diaphragm spring, and bearing holding means slidably disposed on a fixed guide for holding the clutch release bearing and receiving a drive force from the fork member. An axial drive force applied to the fork member is transmitted from the clutch release bearing to the diaphragm spring through the bearing holding means to release the clutch.

It is necessary that the clutch release bearing be made alignable to compensate for eccentricity (deviation of the axis) or inclination caused between the central axis thereof and the central axis of the diaphragm spring during assembly. Various contrivances have heretofore been made in order to hold the clutch release bearing in alignment relative to the bearing holding means, and an example thereof is shown in FIG. 1 of the accompanying drawings (Japanese Laid-open Utility Model Application No. 137726/1980).

In FIG. 1, a fork receiving member 4 is fitted to a sleeve 2 slidably disposed on a fixed guide, not shown, and a spherical free wheel 8 having a spherical surface 6 is mounted in a corner portion defined by the sleeve 2 and the fork receiving member 4. A clutch release bearing 10 has a bearing portion 14 for acting upon a diaphragm spring 26. Bearing portion 14 is made integral with an inner race 12 and is held by a support cover 18 fitted to an outer race 16. The inwardly facing flange 20 of the support cover 18 extends between the bearing 10 and the spherical free wheel 8 and is contact with the spherical surface 6 of the free wheel 8 along a conical surface 22 thereof. A planar surface 27 of the spherical free wheel 8 is adapted to be guided in a direction perpendicular to the axis by the flat surface of a friction plate 28 secured to the surface of the fork receiving member 4 which is opposed to the free wheel 8. The support cover 18 of the bearing 10 is such that the spherical surface 6 and the conical surface 22, and the planar surface 27 and the surface of the friction plate 28 are positively brought into contact with each other by resilient means 24 secured to the sleeve 2.

In operation of the above-described device, when there is eccentricity or inclination of the central axis between the bearing 10 and the diaphragm spring 26, the bearing 10 rocks due to centripetal force. The conical surface 22 and the planar surface 27 are guided as the bearing rocks by the spherical surface 6 and the friction plate 28, respectively, whereby the eccentricity or inclination is adjusted.

However, in such apparatus wherein the free wheel 8 is adapted to be moved in a plane perpendicular to the axis relative to the fork receiving member 4 and wherein the bearing 10 is adapted to rock while being guided by the spherical surface 6 of the free wheel 8, the alignment stability for vibration or shock is generally inadequate.

SUMMARY OF THE INVENTION

It is an object of the present invention to eliminate such disadvantage peculiar to the prior art, that is, to provide a clutch release apparatus constructed such that eccentricity and/or inclination between the central axis of the clutch release bearing and the central axis of the clutch diaphragm spring may be compensated without adversely affecting the alignment stability of the bearing.

To achieve the above object, in the present invention, an aligning auxiliary member is interposed between the clutch release bearing and the bearing holding means. The aligning auxiliary member is made rockable in all directions in a cubic space about a certain point while being controlled by the bearing holding means and the clutch release bearing is made rockable in all directions in a cubic space about another point while being controlled by the aligning auxiliary member. The aligning auxiliary member and the bearing are held in dynamically stable positions obtained through the rocking movement thereof.

The invention will become more fully apparent from the following detailed description thereof taken in conjunction with the accompanying drawings.

BRIEF DESCRIPTION OF THE DRAWINGS

FIG. 2 is a cross-sectional view showing a first embodiment of the present invention.

FIGS. 5, 6 and 7 are cross-sectional views or illustrations showing second, third and fourth embodiments, respectively, of the present invention.

DESCRIPTION OF THE PREFERRED EMBODIMENTS

Figure 1:
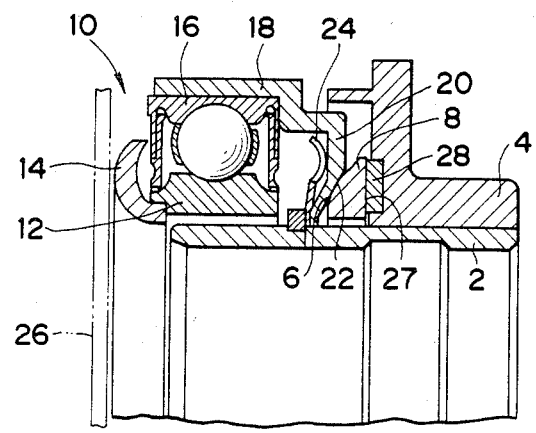
FIG. 1 is a cross-sectional view showing an example of the prior art.

The invention will hereinafter be described in more detail by reference to the drawings showing several embodiments thereof. As shown in FIG. 2, a clutch release bearing 30 includes an inner race 34 provided with a portion 32 which bears against the diaphragm spring 26 of a clutch mechanism, a rolling member 36, an outer race 38 and a seal 42. A bearing holding means 50 includes a driving member 56 comprising a cylindrical portion 52 slidably fitted on a fixed guide, not shown, a disk portion 54, a case 58 fixed to the outer end of the disk portion 54 by a caulking portion 55 and extending sideways from the outer portion of the outer race 38, and a spring 62 interposed between a bent portion 60 of the case 58 and the outer race 38.

Figure 3:
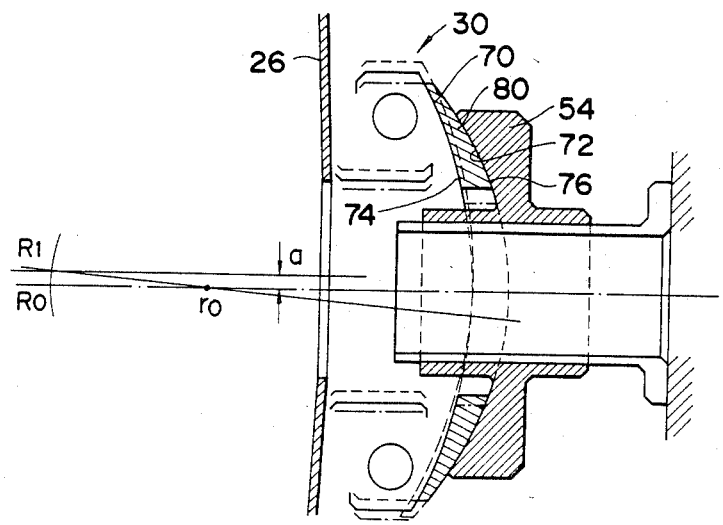
FIGS. 3 and 4 illustrate the operation of the first embodiment.

As shown in FIGS. 2 and 3, one end surface (the right end surface as viewed in FIG. 2) of the outer race 38 of the bearing 30 is formed into a convex spherical surface 70 centered at $R_0$ and having a radius of curvature R, while one side surface (the left side surface as viewed in FIG. 2) of the disk portion 54 of the driving member 56 is formed into a concave spherical surface 72 centered at $r_0$ and having a radius of curvature r ($R > r$). A ring-like aligning auxiliary member 80 having one end surface thereof (the left end surface as viewed in FIG. 2) formed into a concave spherical surface 74 having a radius of curvature R and the other end surface (the right end surface as viewed in FIG. 2) formed into a convex spherical surface 76 having a radius of curvature r is interposed between the two spherical surfaces 70 and 72. The spherical surfaces 70 and 74 and the spherical surfaces 72 and 76 are positively brought into contact with each other by the action of the spring 62. A gap 86 lies between the outer race 38 and the case 58 and a gap 88 lies between the inner race 34 and the cylindrical portion 52, whereby movement of the bearing 30 to its aligning position is permitted.

Operation of the present embodiment will now be described.

When a fork member 82 bears against the disk portion 54 to apply an operating force in the axial direction to the driving member 56, the bearing 30 is also moved in the same direction (the leftward direction as viewed in FIG. 2) and the bearing portion 32 of the inner race 34 comes into contact with the diaphragm spring 26 to thereby release the clutch.

The aligning action will now be described. Let it be assumed that as shown in FIG. 3, the central axis of the bearing 30 is eccentric by a distance a relative to the central axis of the diaphragm spring 26 of the apparatus, as assembled. To compensate such eccentricity, it is necessary to move the central axis of the bearing 30 by the distance a to make the central axis of the bearing 30 coincident with the central axis of the diaphragm spring. Movement of the bearing 30 to its aligning position is achieved by a combination of the rocking movement of the aligning auxiliary member 80 and the bearing 30 relative to the driving member 56 caused by the contact between the convex spherical surface 76 and the concave spherical surface 72, and the rocking movement of the bearing 30 relative to the aligning auxiliary member 80 caused by the contact between the convex spherical surface 70 and the concave spherical surface 74. Initially, the bearing 30 and the aligning auxiliary member 80 are rocked clockwise (as viewed in FIG. 3) about the point $r_0$ by a centripetal force produced by the rotation of the inner race 34 during clutch release. This rocking movement continues until the central axis of the bearing 30 passes through the point of intersection $R_1$ between an arc with a segment $\overline{r_0R_0}$ as its radius and the eccentric central axis of the diaphragm spring 26. As a result of this rocking movement, the bearing 30 and the bearing aligning member 80 move to their positions indicated by dot-and-dash lines in FIG. 3. To realize this rocking movement, first means for controlling the rocking movement of the aligning auxiliary member 80 relative to the bearing holding means 50 is constituted by the convex spherical surface 76 and the concave spherical surface 72.

Next, only the bearing 30 is rocked counterclockwise (as viewed in FIG. 3) about the point $R_1$ by the aforementioned centripetal force. The bearing 30 thereby assumes its position indicated by broken lines in FIG. 3 (the aligning position) and thus, the central axis of the bearing 30 becomes coincident with the central axis of the diaphragm spring 26. It will be appreciated that second means for controlling the rocking movement of the bearing 30 relative to the aligning auxiliary member 80 is constituted by the convex spherical surface 70 and the concave spherical surface 74. The aligning position of the bearing 30 is a dynamically stable position in which the centripetal force acts no longer even if the inner race 34 contacts the diaphragm spring 26 and rotates during clutch release. After alignment, the bearing 30 is kept in this stable position by the action of the spring 62.

Figure 4:
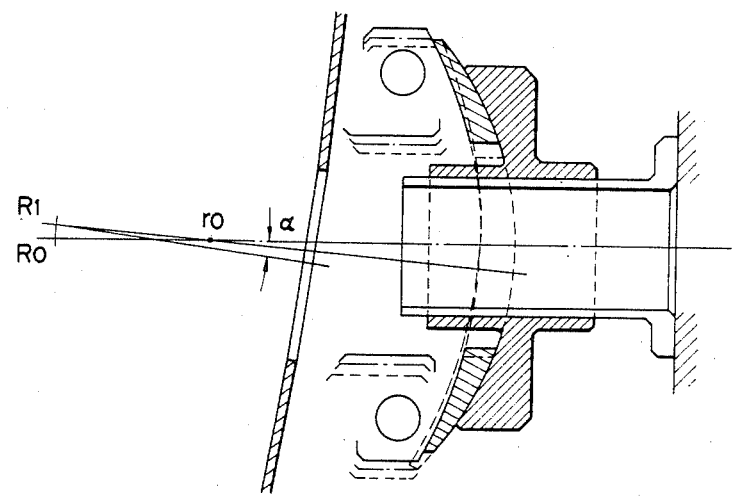

FIG. 4 depicts the operation of the invention where the central axis of the diaphragm spring 26 is inclined clockwise (as viewed in FIG. 3) by an angle $\alpha$ with respect to the central axis of the bearing 30. As in the case of compensating eccentricity, the bearing 30 and the aligning auxiliary member 80 first rock clockwise about the point $r_0$ and assume their positions indicated by dot-and-dash lines. Thereafter only the bearing 30 further rocks clockwise about the point $R_1$ and assumes its position indicated by broken lines, whereby the inclination is compensated.

As described above, even if there is eccentricity or inclination between the central axis of the diaphragm spring 26 and the central axis of the bearing 30 in the apparatus as assembled, in operation the bearing 30 will rock under the guidance of two guide surfaces (in the embodiment of FIG. 2, the concave and convex spherical surfaces 74 and 76) and be brought into alignment irrespective of the magnitude and direction of the eccentricity or inclination.

In addition, when the guide surfaces are both spherical (such as the surfaces 74 and 76 in the embodiment of FIG. 2), the alignment of the bearing 30 is more stable under adverse conditions in which shock or vibration is imparted, as compared with a case where one of the two guide surfaces is planar.

Further embodiments of the present invention will now be described successively. In the following description of each embodiment, for the sake of simplicity, only the differences from the previous embodiment will be addressed in detail.

In a second embodiment shown in FIG. 5, a convex spherical surface 94 having a radius of curvature R is formed on an extension 92 of the outer race 38 of a bearing 30, and a convex spherical surface 96 having a radius of curvature r is formed on the disk portion 54 of a driving member 56. An aligning auxiliary member 98 has concave spherical end surfaces 102 and 104 complementary to the respective surfaces 94 and 96. Spherical surface 102 has a radius of curvature R and spherical surface 104 has a radius of curvature r. A spring 106 for biasing the bearing 30 toward the disk portion 54 is secured to a cylindrical portion 52 of drive member 56 and is in resilient contact with the extension 92 of the outer race 38.

In the present embodiment, the spherical surfaces 102 and 96 provide guide surfaces and the eccentricity or inclination of the bearing 30 compensated in a manner substantially similar to that as has been described with respect to the first embodiment (except for the fact that the center of rocking movement about which the bearing 30 rocks relative to the aligning auxiliary member 98 and the center of rocking movement about which the aligning auxiliary member 98 rocks relative to the disk portion 56 lie at the opposite sides of the aligning auxiliary member 98).

In a third embodiment shown in FIG. 6, a convex spherical surface 112 having a radius of curvature R (the center of curvature lies on the central axis of an aligning auxiliary member 122) is formed on a support plate 110 which is loosely fitted to a cylindrical member 52 and secured to the end portion of an outer race 38. A convex spherical surface 114 having a radius of curvature r is formed on the disk portion 54 of a driving member 56, and a spring 116 secured to the cylindrical portion 52 is in resilient contact with the support plate 110. A ring-like aligning auxiliary member 122 of a dog-legged cross-sectional shape is provided with conical surfaces 118 and 120 on the opposite sides thereof and is interposed between the bearing 30 and the disk portion 54. One conical surface 118 is in contact with the convex spherical surface 112 of the support plate 110 and the other conical surface 120 is in contact with the convex spherical surface 114 of the disk portion 54.

In the present embodiment, the bearing 30 and the aligning member 122 are brought into contact with each other along the convex spherical surface 112 and the conical surface 118, and the aligning member 122 and the disk portion 54 are brought into contact with each other along the convex spherical surface 114 and the conical surface 120. The conical surfaces 118 and 120 contact the convex spherical surfaces 112 and 114 tangentially and rotate about the centers of curvature of the convex spherical surfaces 112 and 114. An effect substantially similar to that of the second embodiment (see FIG. 5) is thereby obtained. In addition, the use of conical surfaces 118 and 120 rather than the spherical surfaces renders the aligning member 122 more easily manufactured.

The present invention should not be interpreted as being restricted to the above-described embodiments, but for example, the magnitudes of the radii of curvature of the concave and convex spherical surfaces can be selected as desired. Also, the bearing 30 may be of the outer race rotation type instead of the inner race rotation type.

Figure 7:
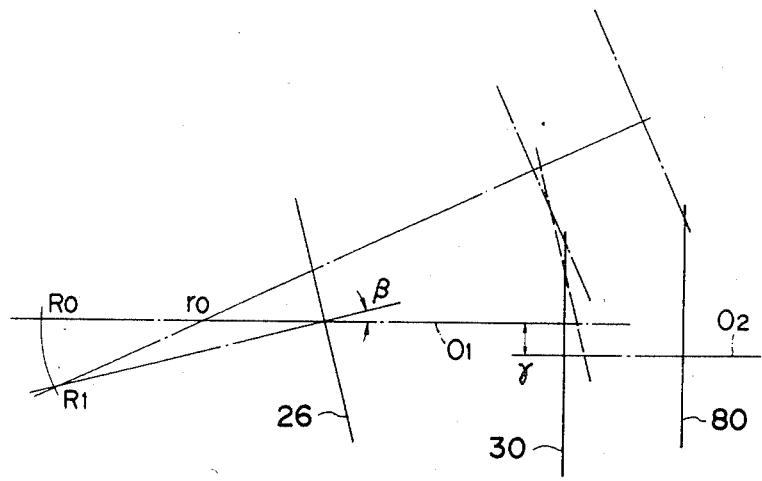

Further, in each of the above-described embodiments, the center line of rotation of the bearing 30 is coincident with the central axis of the aligning auxiliary member 80. It is possible, however, that these axes be eccentric with respect to each other. For example, let it be assumed that as shown in FIG. 7, the central axis $O_1$ of the bearing 30 and the central axis $O_2$ of the aligning auxiliary member 80 are eccentric with respect to each other and the diaphragm spring 26 is inclined by an angle $\beta$ on the axis $O_1$. In this case, the bearing 30 and the aligning auxiliary member 80 will first rock counterclockwise about the point $r_0$ to their positions indicated by dot-and-dash lines, and then only the bearing 30 will rock clockwise about the point $R_1$ to its position indicated by broken lines.

According to the present invention, as has hitherto been described, even if eccentricity and/or inclination of the central axis are caused between the clutch release bearing and the diaphragm spring, these may be reliably compensated without the alignment stability of the bearing being injured.

I claim:

1. In a self-aligning type clutch release bearing apparatus including clutch release bearing means for releasing a clutch, bearing holding means mounted substantially coaxially with and slidable along a rotational axis of the clutch for holding and guiding said bearing means, the bearing holding means being drivable by clutch actuating means, and a self-aligning coupling interposed between said bearing means and said bearing holding means for effecting aligning movement of said bearing means relative to said rotational axis of the clutch, the improvement wherein said self-aligning coupling comprises:

an aligning auxiliary member disposed between said bearing means and said bearing holding means, said auxiliary member having first and second faces which mate respectively with a portion of said bearing holding means and a portion of said bearing means;

first means for rendering said auxiliary member capable of aligning movement in all directions about a first point relative to said bearing holding means;

second means for rendering said bearing means capable of aligning movement in all directions about a different point relative to said auxiliary member; and biasing means for retaining said auxiliary member in frictional engagement with said bearing means and said bearing holding means and for damping aligning movement between said bearing holding means and said auxiliary member and between said auxiliary member and said bearing means.

2. The improvement of claim 1, wherein said first means comprises a spherical surface formed on said portion of said bearing holding means and a complementary spherical surface formed on said first face of said aligning auxiliary member, said spherical surfaces having the same radius of curvature.

3. The improvement of claim 1, wherein said second means comprises a spherical surface formed on said portion of said clutch release bearing means and a complementary spherical surface formed on said second face of said aligning auxiliary member, said spherical surfaces having the same radius of curvature.

4. The improvement of claim 1, wherein said biasing means includes a spring for biasing said clutch release bearing toward said bearing holding means.

5. The improvement of claim 1, wherein said first means comprises a convex spherical surface formed on said portion of said bearing holding means and a conical surface formed on said first face of said aligning auxiliary member.

6. The improvement of claim 1, wherein said second means comprises a convex spherical surface formed on said portion of said clutch release bearing means and a conical surface formed on said second face of said aligning auxiliary member.

7. The improvement of claim 3, wherein said clutch release bearing means includes an inner race and an outer race and wherein said spherical surface of said clutch release bearing means is formed on an end of said outer race.

8. The improvement of claim 3, wherein said clutch release bearing means includes an inner race and an outer race and wherein said spherical surface of said clutch release bearing means is formed on a plate supporting said outer race.

9. Self-aligning type clutch release bearing apparatus comprising:

a clutch release bearing having an inner ring disposed for contact with a diaphragm of a clutch and an outer ring disposed about said inner ring;

bearing holding means including a cylindrical member substantially coaxial with a rotational axis of the clutch and slidable along said axis and a flange member extending radially outward from said cylindrical member and drivable by a clutch actuating means;

an aligning auxiliary member disposed between said flange member and said outer ring and having first and second surfaces respectively mating with a face of said flange member and a face of said outer ring, said first surface and said face of said flange member being cooperable to render said auxiliary member alignable in all directions about a first point, said second surface and said face of said outer ring being cooperable to render said clutch release bearing alignable in all directions about a second point different point said first point; and biasing means for urging said first and second faces of the aligning auxiliary member into frictional engagement with said face of said flange member and said face of said outer ring, respectively, and for damping aligning movement between said flange member and said auxiliary member and between said auxiliary member and said outer ring.

* * * * *